United States Patent [19]

Kuypers

[11] 4,411,302
[45] Oct. 25, 1983

[54] SNAP-IN TIRE VALVE

[75] Inventor: Harold A. Kuypers, Nashville, Tenn.

[73] Assignee: Scovill Inc., Waterbury, Conn.

[21] Appl. No.: 306,286

[22] Filed: Sep. 28, 1981

[51] Int. Cl.³ .............................................. B60C 29/00
[52] U.S. Cl. ........................... 152/427; 152/DIG. 11;
    285/319; 285/DIG. 22; 403/288; 403/327;
    137/223; 251/143
[58] Field of Search ...................... 152/427, DIG. 11;
    285/DIG. 22, 319

[56]  References Cited
U.S. PATENT DOCUMENTS 2,475,451  7/1949  Gouivand ........................ 152/427
2,954,248  9/1960  Brickman .................. 285/DIG. 22
3,221,572 12/1965  Swiek ....................... 285/DIG. 22
4,064,923 12/1977  German ........................... 152/427

Primary Examiner—Harold W. Weakley
Attorney, Agent, or Firm—Dallett Hoopes

[57] ABSTRACT

Snap-in tire valve includes rigid base larger than the rim hole opening so that the valve cannot be extruded therethrough. Valve is held in place by spring clip surrounding the valve stem.

1 Claim, 5 Drawing Figures

SNAP-IN TIRE VALVE

BACKGROUND OF THE INVENTION

1. Field of the Invention

This invention relates to tubeless tire valves of the general type exemplified by U.S. Pat. No. 2,966,191 and generally called "snap-in" tire valves. More specifically, the invention relates to a snap-in tire valve designed for use with tire or other container containing gas at relatively high pressure.

2. Description of the Prior Art

As stated, the prior art contains examples of snap-in tire valves, an example being the above-mentioned patent granted Dec. 27, 1960 to S. T. Williams and assigned to my assignee. Another example is shown in U.S. Pat. No. 2,845,979 which issued Aug. 5, 1958 also to S. T. Williams and assigned to my assignee.

While the above described prior art has been emminently satisfactory as applied to passenger car tires, there is occasion for use of such a valve under higher pressure. The valves of the prior art, having their bases totally of rubber, have tended under applications of high pressure to forceably extrude through the rim hole opening and separate totally from the wheel. Also, there is occasionally a need for a tire valve in which the base is of rigid material to serve as a housing for a poppet or the like.

SUMMARY OF THE INVENTION

Under the present invention, the lower end of the valve stem or insert is formed with a rigid enlargement or base larger than the rim hole opening to preclude any possibility of the valve being extruded out the rim hole opening. Against the base, a gasket of rubber or the like is provided, and a slitted skirt-like clip encircles the upper portion of the stem and keeps the valve in position in the rim hole applying a sealing pressure and holding the gasket snugly against the rim.

BRIEF DESCRIPTION OF THE DRAWINGS

Other objects and features of the invention will be apparent from the following description and the accompanying drawings, all of which disclose a non-limiting form of the invention. In the drawings.

DESCRIPTION OF THE PREFERRED EMBODIMENT

Figure 1:
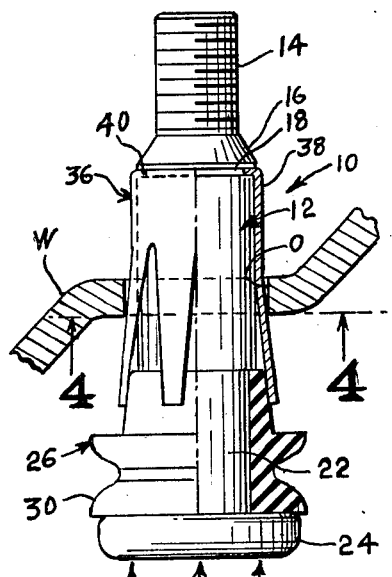
FIG. 1 shows a valve embodying the invention in the process of being inserted into a rim hole opening, the rightward side of the valve being shown with the clip and gasket broken to assist in understanding of the structure.

Referring more specifically to the drawings, the embodiment of the invention is shown in FIG. 1 wherein the valve is generally designated 10. A fragment of the wheel W is shown containing the rim hole opening O.

Figure 3:
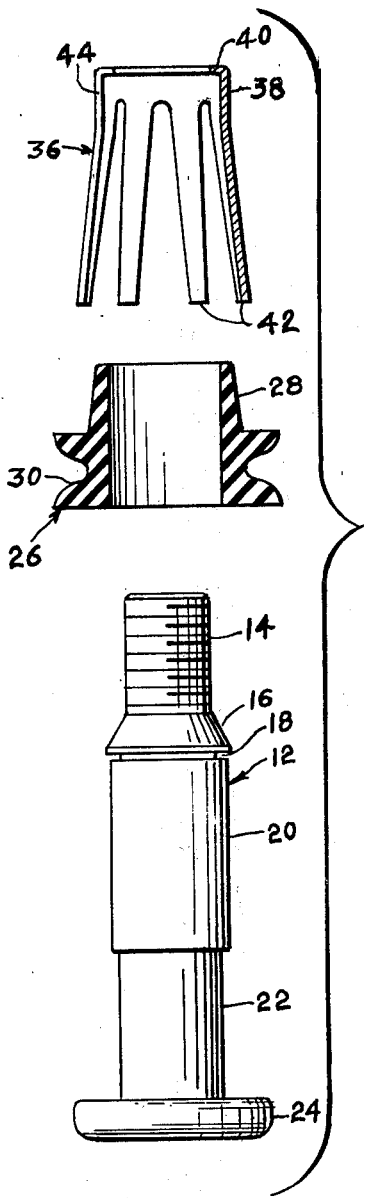
FIG. 3 is an exploded, partly sectional view.

The valve 10 comprises a stem 12, preferably of brass or other rigid material, and having the usual threaded upper end 14 with an outwardly bevelled portion 16 therebelow (FIG. 3). Slightly spaced beneath the bevelled portion is a groove 18. Beneath the groove a cylindrical section 20 is formed, which which may be slightly reduced in a zone 22. The lower end terminates in an outward flange comprising base 24.

Figure 2:
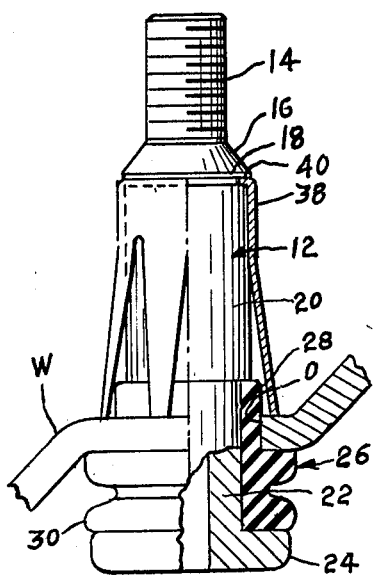
FIG. 2 shows the valve as in FIG. 1 but fully seated with the clip retaining the valve in position. A portion of the lower end of the stem is also broken away.

As shown in FIG. 2, the stem of the valve is hollow, as is conventional, to permit the passage in both directions of air or the like. A conventional core (not shown) is threadedly received received into the upper end of the bore of the valve. A gasket 26 is provided and is formed of rubber or the like, and is adapted to be disposed on the valve stem in the reduced area 22. The gasket as shown in FIG. 3 is tapered at 28 to snugly engage the rim hole opening O and therebelow is flanged as at 30 to seat against the inside of the rim adjacent the opening O.

Figure 4:
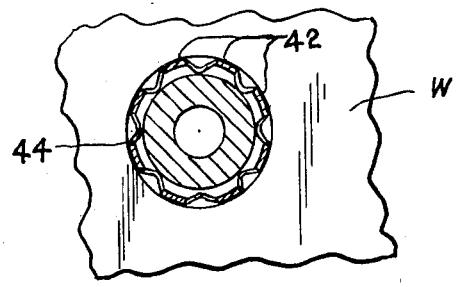
FIG. 4 is a sectional fragmentary view taken on the line 4—4 of FIG. 1.
Figure 5:
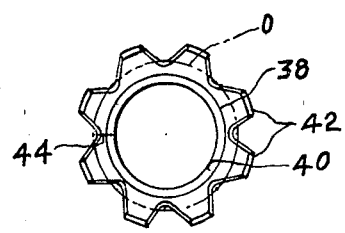
FIG. 5 is a bottom view of the retaining clip and showing in phantom the diameter of the rim hole opening.

The retaining clip 36 of spring steel is provided and shaped as shown best in FIG. 3. The clip is formed with an annular portion 38, which hugs the stem. The upper end of the annular portion is inwardly turned as at 40 to engage in the groove 18 (FIG. 3). From the lower end of the annular section 38 extend uniformly spaced preferably straight outward fingers 42. The fingers are each preferably tapered, narrowing as its lower end is approached. The clip is radially slit as at 44 (FIG. 4) to permit it to spread as it rides on bevel 16 in assembly and thereafter snap in to huggingly engage in the groove 18.

In installation, with the valve assembled as shown in FIGS. 1 and 2, the gasket 26 disposed in reduced section 22 and the clip engaging in the groove 18, the valve is inserted, threaded end first through the opening O causing the fingers 42 to squeeze together to permit their passage all the way through the opening O. As shown, the lower ends of the fingers may engage the tapered section 28 of the gasket, the tapered section yielding to permit passage of the fingers through opening O as necessary. When the valve is through the opening to where the gasket flange 30 engages the rim W and is compressed thereagainst, the fingers will clear the rim and snap out as shown in FIG. 2, the resilience of the gasket flange 30 being enough to hold the valve with the fingers 42 firmly engaging the rim.

After installation, the valve may be used in a normal way, the threaded fitting 14 providing a filling, discharging and gauging connection.

The material of the various parts of the valve will be readily arrived at by those skilled in the art. Suffice it to say that the metal of the clip, including the fingers, are preferably of a cold rolled spring steel AISI-1074, partially hardened and tempered. Alternatively, the clip may be of a resilient plastic.

As suggested earlier, the invention finds application not only to the conventional type of valve particularly in high pressure applications, but also to those valves that require a rigid base as, for instance, shown in U.S. Pat. No. 3,827,393 for "A Vehicle Tire Deflation Signalling Means" as issued to Harry C. Winther, Aug. 6, 1974, wherein the base contains a poppet valve opened at low tire pressure to activate a signalling means.

Thus, while only one embodiment of the invention has been disclosed, it is not so limited but is capable of many modifications and variations, all falling within the scope of the following claim language or equivalents thereof.

I claim:

1. A tire valve comprising a rigid tubular body having an enlarged base and formed with a groove spaced from the base, gasket means having an annular flange portion and a tapered longitudinal extension surrounding the body adjacent the base, and an annular spring C-shaped clip surrounding and engaging the body in the groove and having a plurality of straight tapered spring fingers narrowing as their distal ends are approached extending outward and generally toward the base, whereby the valve can be inserted into a rim hole opening, smaller end first, so that the fingers flex inward toward the center of the valve until they are through the opening and then spring outward to trap the valve in the opening with the gasket in compressive sealing relation to the rim.

* * * * *

REEXAMINATION CERTIFICATE (463rd)

United States Patent [19]

Kuypers

[11] B1 4,411,302

[45] Certificate Issued  Feb. 11, 1986

[54] SNAP-IN TIRE VALVE

[75] Inventor: Harold A. Kuypers, Nashville, Tenn.

[73] Assignee: Scovill Inc., Waterbury, Conn.

Reexamination Request:
No. 90/000,588, Jul. 10, 1984

Reexamination Certificate for:
Patent No.: 4,411,302
Issued: Oct. 25, 1983
Appl. No.: 306,286
Filed: Sep. 28, 1981

[51] Int. Cl.[4] .............................. B60C 29/00
[52] U.S. Cl. ..................... 152/427; 152/DIG. 11;
285/319; 285/DIG. 22; 403/288; 403/327;
137/223; 251/143

[58] Field of Search .......... 152/427, 428, DIG. 7,
152/DIG. 11, DIG. 13

[56] References Cited

U.S. PATENT DOCUMENTS

| | | | |
|---|---|---|---|
| 2,475,451 | 7/1949 | Gouirand | 152/427 |
| 2,835,304 | 5/1958 | Lee | 152/DIG. 11 |
| 2,954,248 | 9/1960 | Brickman | 287/20 |
| 3,221,572 | 12/1965 | Swick | 152/427 |
| 4,064,923 | 12/1977 | German et al. | 152/427 |
| 4,364,427 | 12/1982 | Lefrancois | 152/427 |

FOREIGN PATENT DOCUMENTS

2385548  10/1978  France .

*Primary Examiner*—Lois E. Boland

[57] ABSTRACT

Snap-in tire valve includes rigid base larger than the rim hole opening so that the valve cannot be extruded therethrough. Valve is held in place by spring clip surrounding the valve stem.

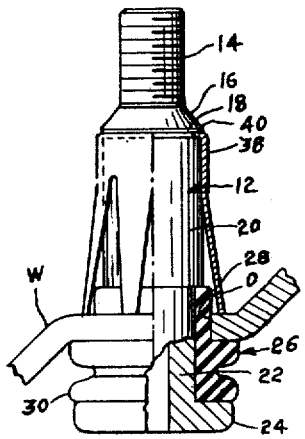

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 1 is cancelled.

* * * * *